US012700761B2

(12) United States Patent (10) Patent No.: US 12,700,761 B2
Carter et al. (45) Date of Patent: Aug. 4, 2026

(54) PERMANENT MAGNET FOR AN ELECTRIC MACHINE AND METHOD OF MAKING THE SAME

(71) Applicant: BorgWarner Inc., Auburn Hills, MI (US)

(72) Inventors: Jeffrey Carter, Harrogate (GB); Lathom Louco, Arden, NC (US)

(73) Assignee: BORGWARNER INC., Auburn Hills, MI (US)

( * ) Notice: Subject to any disclaimer, the term of this patent is extended or adjusted under 35 U.S.C. 154(b) by 185 days.

(21) Appl. No.: 18/406,507

(22) Filed: Jan. 8, 2024

(65) Prior Publication Data

US 2024/0235289 A1 Jul. 11, 2024

Related U.S. Application Data

(60) Provisional application No. 63/438,287, filed on Jan. 11, 2023.

(51) Int. Cl.
*H02K 1/2733* (2022.01)
*H02K 15/03* (2025.01)
*H02K 21/14* (2006.01)

(52) U.S. Cl.
CPC ........... *H02K 1/2733* (2013.01); *H02K 15/03* (2013.01); *H02K 21/14* (2013.01)

(58) Field of Classification Search
CPC ....... H02K 1/2733; H02K 15/03; H02K 21/14
USPC .................................................. 310/156.38
See application file for complete search history.

(56) References Cited

U.S. PATENT DOCUMENTS 10,309,300 B2 * 6/2019 Garrard ................... F01D 25/24
2022/0293318 A1 9/2022 Weber

FOREIGN PATENT DOCUMENTS

| CN | 107394921 | * | 11/2017 | ............. H02K 1/278 |
| EP | 2760112 | * | 7/2014 | ............... H02K 1/27 |
| EP | 2760112 B1 | | 8/2015 | |
| WO | 2018014141 A1 | | 1/2018 | |
| WO | 2020030241 A1 | | 2/2020 | |
| WO | 2021139877 A1 | | 7/2021 | |
| WO | WO2021139877 | * | 7/2021 | |

OTHER PUBLICATIONS

Willis, D.A. et al., "Reducing PM Eddy Current Rotor Losses by Partial Magnet and Rotor Yoke Segmentation", XIX Int. Conf. on Electrical Machines, ICEM, Rome, 2010, 6 pages.
English language abstract and machine-assisted English translation for WO 2018/014141 A1 extracted from espacenet.com database on Jan. 8, 2024, 13 pages.

* cited by examiner

*Primary Examiner* — Ahmed Elnakib
(74) *Attorney, Agent, or Firm* — Howard & Howard Attorneys PLLC

(57) ABSTRACT

A permanent magnet for use in an electric machine has a magnet thickness and extends along a magnet axis. The permanent magnet defines a groove extending axially along the magnet axis. The groove has a groove depth that is less than the magnet thickness. The groove has a non-straight configuration with respect to the magnet axis.

20 Claims, 11 Drawing Sheets

PERMANENT MAGNET FOR AN ELECTRIC MACHINE AND METHOD OF MAKING THE SAME

CROSS REFERENCE TO RELATED APPLICATIONS

The present application claims priority to and all the benefits of U.S. Provisional Patent Application No. 63/438,287, filed on Jan. 11, 2023, which is hereby expressly incorporated herein by reference in its entirety.

BACKGROUND OF THE INVENTION

1. Field of the Invention

The subject disclosure generally relates to a permanent magnet and, more specifically, a permanent magnet for an electric machine and a method of making the permanent magnet.

2. Description of the Related Art

Permanent magnet machines, in particular permanent magnet machines with single-tooth windings, often suffer from losses due to eddy currents induced within the permanent magnets. Eddy currents are undesirable because eddy currents lead to the generation of excess heat, which can result in thermal over loading and failure of the electric machine. Eddy currents are typically caused by two events. First, eddy currents are typically caused by a changing/pulsating of the magnet field in an air gap formed between the permanent magnet and other components of the electric machine. The pulsating of the magnetic field depends on the particular design of the permanent magnet and the current fed into a stator of the electric machine. Second, eddy currents are caused by a changing magnetic flow caused by feeding voltages to the single-tooth windings of the electric machine.

To help reduce eddy current losses, permanent magnets are typically segmented, i.e., cut into smaller pieces and then reassembling the pieces to form a rotor. In other words, conventional permanent magnets include two or more pieces that are coupled together. However, there remains a need to design a permanent magnet that further reduces eddy currents.

SUMMARY OF THE INVENTION AND ADVANTAGES

A permanent magnet for use in an electric machine has a magnet thickness and extends along a magnet axis. The permanent magnet defines a groove extending axially along the magnet axis. The groove has a groove depth that is less than the magnet thickness. The groove has a non-straight configuration with respect to the magnet axis.

The groove having a non-straight configuration and having a groove depth that is less than the magnet thickness results in an eddy-current reduction, which increases performance of, for example, an electric machine using the permanent magnet. Second, the groove having a non-straight configuration and having a groove depth that is less than the magnet thickness allows for quicker assembly of a rotor. Third, the groove having the non-straight configuration may be varied to optimize the mechanical strength of the permanent magnet versus the magnetic properties of the permanent magnet.

BRIEF DESCRIPTION OF THE DRAWINGS

Other advantages of the present disclosure will be readily appreciated, as the same becomes better understood by reference to the following detailed description when considered in connection with the accompanying drawings.

DETAILED DESCRIPTION OF THE INVENTION

Figure 1:
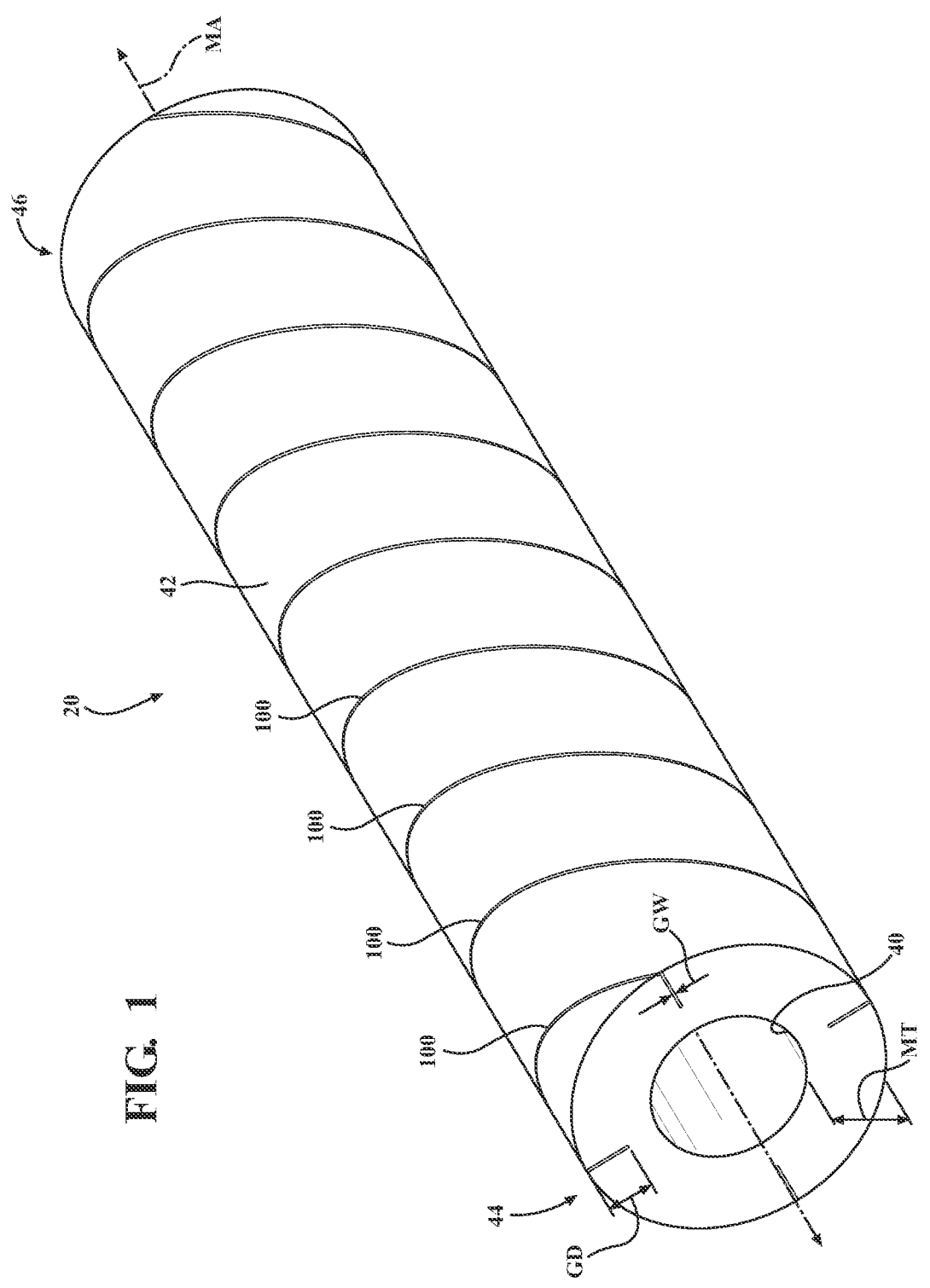
FIG. 1 is a perspective view of a permanent magnet, with the permanent magnet having a magnet thickness and extending along a magnet axis, with the permanent magnet defining a groove that has a groove depth that is less than the magnet thickness, with the groove having a non-straight configuration with respect to the magnet axis, and with the groove spiraling about and along the magnet axis.

With reference to the Figures, wherein like numerals indicate like parts throughout the several views, a permanent magnet 20 is shown in FIG. 1. The permanent magnet 20 has a magnet thickness MT and extends along a magnet axis MA. The permanent magnet defines a groove 100 extending axially along the magnet axis MA that has a groove depth GD that is less than the magnet thickness MT. In other words, the groove 100 is partially defined through the permanent magnet 20 such that the permanent magnet 20 is a unitary component (i.e., one piece). The groove depth GD may be between 20% and 80% of the magnet thickness MT. It is to be appreciated that groove depth GD may be between 25% and 75%, between 30% and 70%, between 35% and 65%, between 40% and 60%, or between 45% and 55%, and may be 50% of the magnet thickness MT. The groove 100 may have a groove width GW between 50-200 µm wide, and in some embodiments between 100-150 µm wide. As shown throughout FIGS. 1 and 2, the groove 100 has a non-straight configuration with respect to the magnet axis MA.

The groove 100 having the groove depth GD that is less than the magnet thickness MT and the groove 100 having a non-straight configuration provides numerous advantages. First, the groove 100 having a non-straight configuration and having a groove depth GD that is less than the magnet thickness MT results in an eddy-current reduction, which increases performance of, for example, an electric machine using the permanent magnet 20. Second, as described in further detail below, the groove 100 having a non-straight configuration and having a groove depth GD that is less than the magnet thickness MT allows for quicker assembly of a rotor because the permanent magnet 20 may be pressed onto a shaft easier than a permanent magnet including two or more pieces. Third, the groove 100 having the non-straight configuration may be varied to optimize the mechanical strength of the permanent magnet 20 versus the magnetic properties of the permanent magnet 20.

Figure 11:
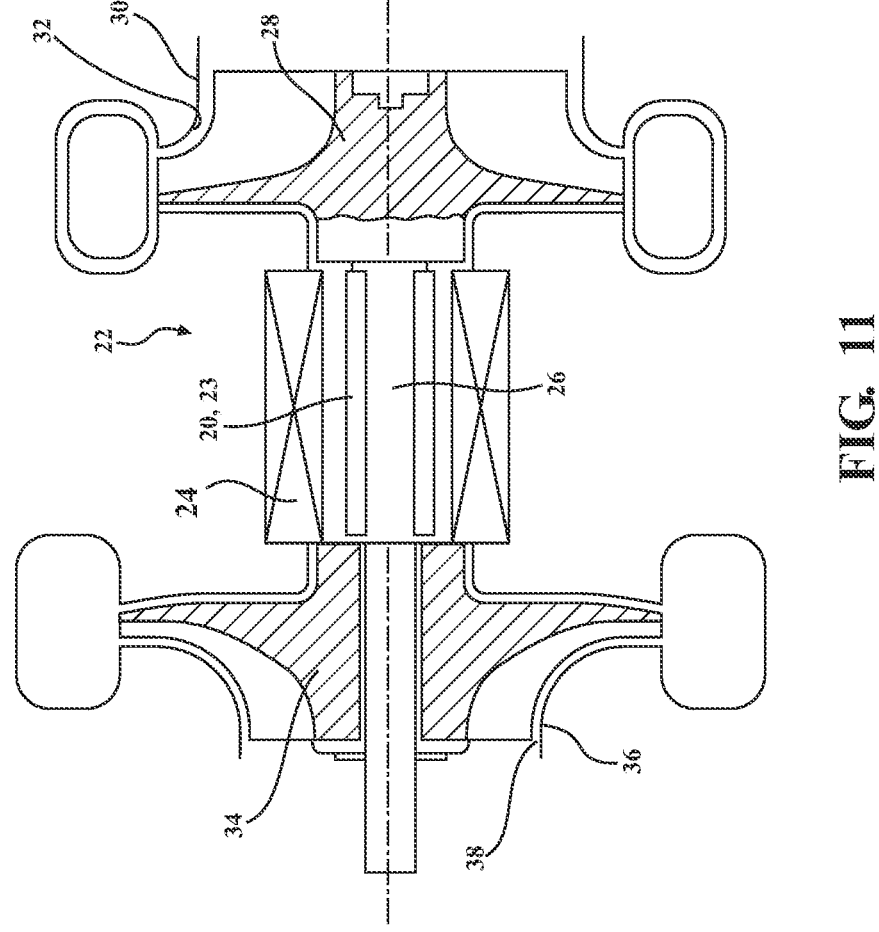
FIG. 11 is a schematic drawing of an electric machine.

The permanent magnet 20 may be used in an electric machine 22, as shown in FIG. 11. The electric machine 22 may be used in any suitable application, such as for turbomachinery, a servo motor, and/or in a vehicle. When the permanent magnet 20 is used in the electric machine 22, the permanent magnet 20 may be commonly referred to as a permanent magnet rotor 23. The electric machine 22 may be used to propel the vehicle, and may be used as a hybrid motor, such as a starter-generator. When the electric machine 22 includes the permanent magnet 20, the electric machine 22 may also include a stator 24 disposed about the permanent magnet rotor 23. The electric machine 22 may be a permanent magnet machine or a synchronous machine. It is to be appreciated that in some embodiments the permanent magnet 20 may be coupled to the stator 24 of the electric machine 22. The electric machine 22 may be configured as a motor, a generator, or as both a motor and a generator. In one embodiment, the electric machine 22 may also include a shaft 26, a compressor wheel 28 coupled to the shaft 26, and compressor housing 30 defining a compressor housing interior 32 with the compressor wheel 28 disposed in the compressor housing interior 32. In such embodiments, the electric machine 22 may deliver compressed air or cooling air to a suitable environment, such as an internal combustion engine, fuel cell, and the like, and may be referred to as an electrically-assisted compressor. The electric machine 22 may further include a turbine wheel 34 coupled to the shaft 26 and spaced axially from the compressor wheel 28, and a turbine housing 36 defining a turbine housing interior 38 with the turbine wheel 34 disposed in the turbine housing interior 38. When the electric machine 22 includes the turbine wheel, the electric machine 22 may be referred to as an electrically-assisted turbomachine. Although FIG. 11 shows the electric machine 22 with both the compressor wheel 28 and the turbine wheel 34, it is to be appreciated that the electric machine may include only the compressor wheel 28, only the turbine wheel 34, both the compressor wheel 28 and the turbine wheel 34, two compressor wheels 28, or neither of the compressor wheel 28 and turbine wheel 34.

The electric machine 22 may be further defined as a high speed electric machine, which is capable of RPMs of the shaft 26 being greater than 300,000 RPM. For example, in certain electric machines, such as a turbocharger or electric compressor, the shaft 26 may rotate at about 350,000 RPM. Such high speed electric machines typically have a low pole number, such as two or four, and radially deep magnets, such as 7 mm thick.

Typically, the permanent magnet 20 has a cylindrical configuration that extends along and surrounds the magnet axis MA. The cylindrical configuration of the permanent magnet 20 defines a magnet interior 40. The permanent magnet 20 includes an outer magnet surface 42 facing away from the magnet axis MA. The groove 100 is typically defined by the outer magnet surface 42.

Figure 2:
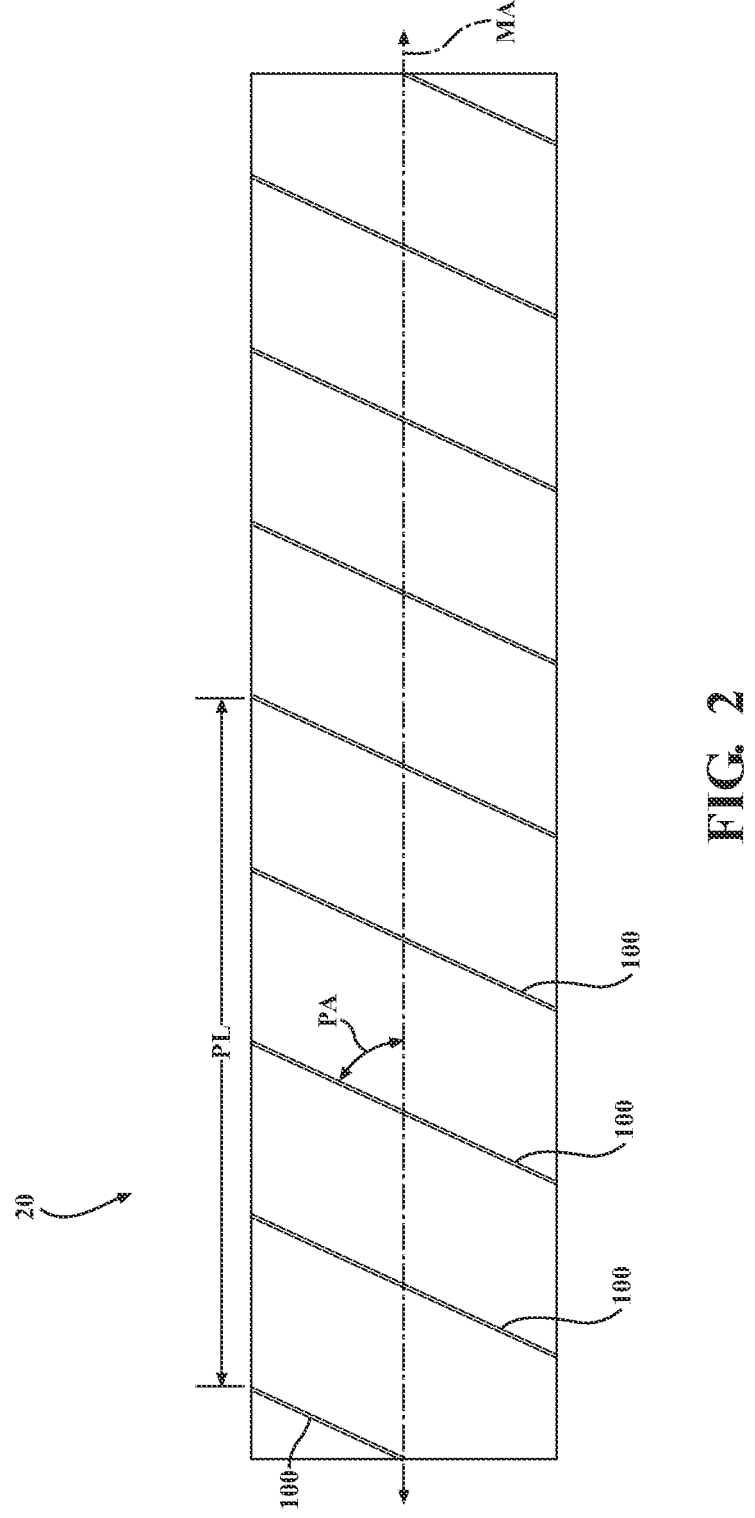
FIG. 2 is a side view of the permanent magnet of FIG. 1.

As shown in FIGS. 1 and 2, the groove 100 may spiral about and along the magnet axis MA. In such embodiments, the groove 100 may define a pitch angle PA. Having the groove 100 spiral about and along the magnet axis MA provides numerous advantages. First, the pitch angle PA may be varied to optimize the mechanical strength of the permanent magnet 20 versus magnet properties. Second, the groove 100 that is spiraled about and along the magnet axis MA is able to be formed with fewer cuts than a permanent magnet having straight cuts. In other words, the groove 100 that is spiraled about and along the magnet axis MA has fewer starts, and in some embodiments will be able to be made with a single cut (e.g., wire cut, water cut, laser cut, chemical etching, and the like), than a permanent magnet having straight cuts (i.e., if there are four grooves 100, then only four cuts need to be made). This decreases the time needed to complete the cutting process of the permanent magnet 20 to form the groove 100, which ultimately decreases the time needed to assembly the electric machine 22. Third, a sleeve may be pressed on the permanent magnet 20 while rotating the permanent magnet such that the sleeve follows the groove 100, rather than having the sleeve pushed against edges of the groove 100. Such sleeves typically have a cylindrical configuration and are pressed onto the outer magnet surface 42 and may have any suitably thickness depending on the application. Such sleeves and the permanent magnet 20 may collectively define a rotor. Fourth, in view of the sleeve being pressed on the permanent magnet 20, the sleeve may be used as a potting mold, and the grooves may be filled by a potting process using a potting material, typically a low-viscosity potting material, which provides thermal conduction and slight mechanical support. The sleeve may be disposed in a typical air gap that is defined between the permanent magnet 20 and the stator 24. The sleeve may be comprised of a thermally conductive material, which enhances the cooling of the permanent magnet 20.

In such embodiments, the groove 100 may define a pitch angle PA between 50 and 60 degrees. The groove 100 may define a pitch angle between 54 and 58 degrees. The groove 100 may define a pitch angle of 56 degrees. It is to be appreciated that the permanent magnet 20 may have any suitable number of grooves 100 spiral about and along the magnet axis MA. For example, the permanent magnet 20 may have one groove 100, two grooves 100, three grooves 100, four grooves 100, five grooves 100, six grooves 100, seven grooves 100, eight grooves 100, and nine or more grooves 100. The number of grooves 100 and pitch angle PA may be adjusted based on specific requirements for the permanent magnet 20 and the electric machine 22. For example, if greater mechanical strength of the permanent magnet 20 is desired, then the permanent magnet 20 may include a lower number of grooves 100 and a higher pitch angle PA for each groove 100. On the other hand, if stronger magnetic properties are desired, then a higher number of grooves 100 and a lower pitch angle PA for each groove 100 may be used.

For example, to determine the number of grooves 100 in embodiments where the groove spirals about and along the magnet axis MA, such as in a helical configuration, the number of grooves 100 may be determined by the formula:

$$\text{Number of grooves} = \text{circumference of the permanent magnet}/(3 * \text{skin depth}),$$

where the skin depth and circumference of the permanent magnet 23 depend on the application of the electric machine 22. For example, when the electric machine 22 is a turbocharger or electric compressor, the skin depth may be 2 mm and the diameter of the permanent magnet 23 may be 30 mm, which results in 16 grooves 100 defined by the permanent magnet 20 [(π*30 mm)/(3*2 mm)=15.7], by rounding the calculated number of grooves 100 to the nearest upper whole number. For skin depths of 3 mm, using the same equation above, the permanent magnet 20 may define 11 grooves 100, by rounding the calculated number of grooves 100 to the nearest upper whole number. On the other hand, for electric machines that are larger, such as traction drive machines, having a skin depth of 2.33 mm and a permanent magnet 23 diameter of 440 mm (440 mm*π to achieve the circumference of the permanent magnet) results in 198 grooves 100. Such electric machines typically have a high pole number. To this end, depending on the application of the electric machine 22, the diameter of the permanent magnet 20, and the skin depth of the permanent magnet 20, an exemplary number of grooves 100 for each specific application may be calculated.

Figure 3:
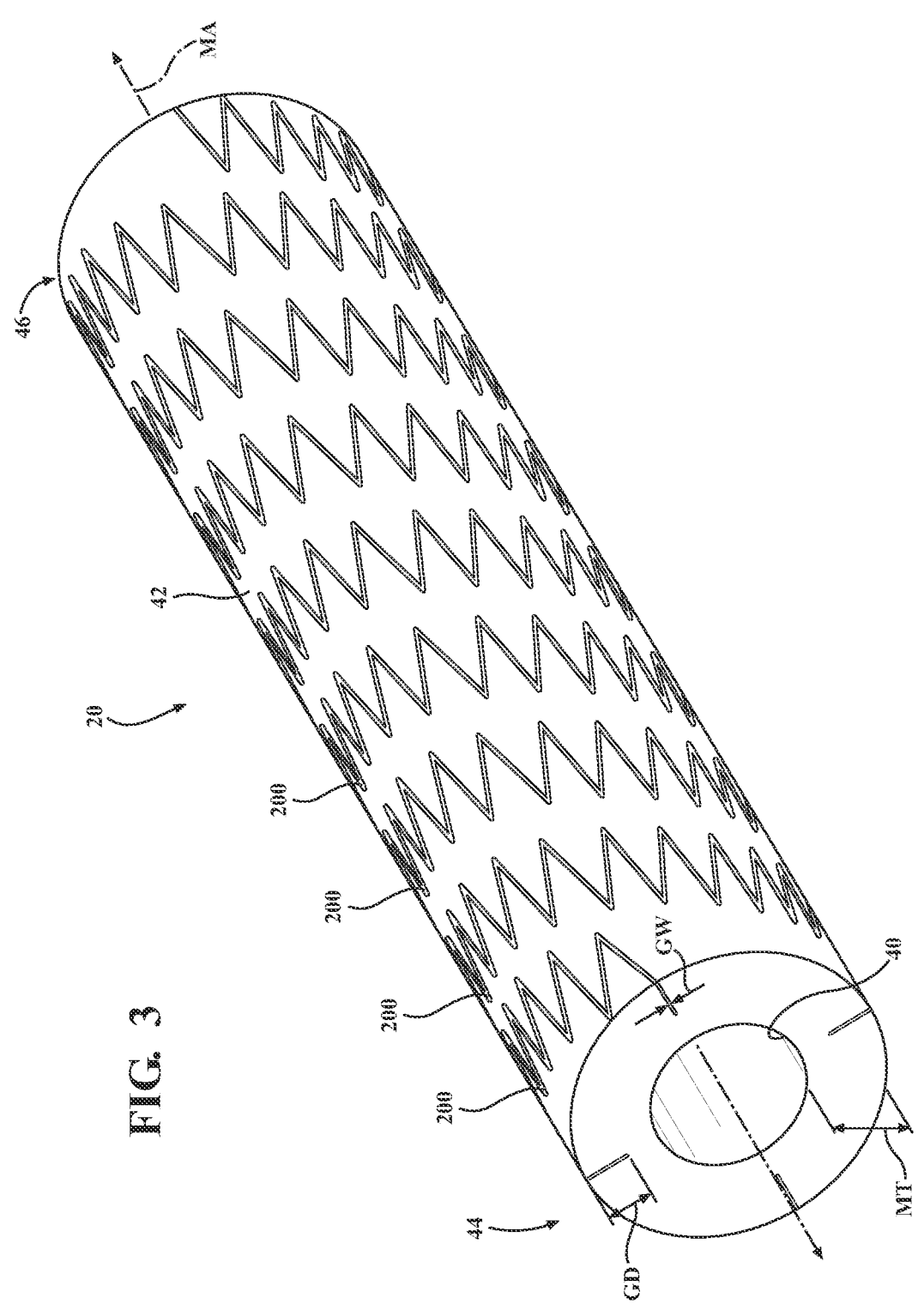
FIG. 3 is a perspective view of another embodiment of the permanent magnet, with the groove spiraling about and along the magnet axis and having a zig-zag configuration.
Figure 4:
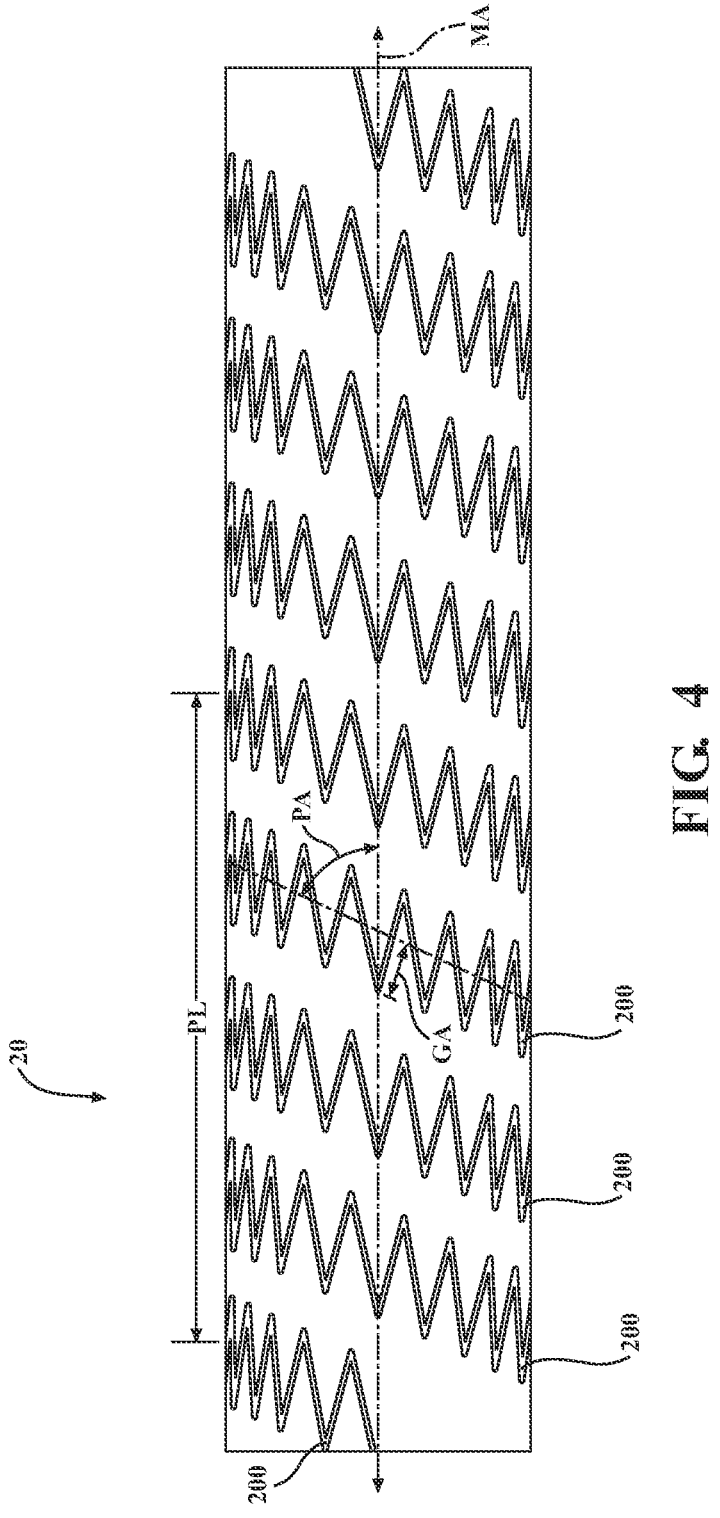
FIG. 4 is a side view of the permanent magnet of FIG. 3.

As shown in FIGS. 3 and 4, the groove 200 is another embodiment in which the groove 200 is shown as being spiraled about and along the magnet axis MA, similar to the embodiment of FIGS. 1 and 2, with the groove 200 of FIGS. 3 and 4 also having a zig-zag configuration, such as a sawtooth. Similarly, the groove 200 has a non-straight configuration with respect to the magnet axis MA. The zig-zag configuration of the groove 200 may have a groove amplitude GA that is 180 degrees offset (in phase) from an adjacent groove 200. Typically, the groove amplitude GA of the groove 200 is less than half of an axial length between an adjacent groove, such as between 41% to 49% of the axial length between two adjacent grooves 200. For example, if the permanent magnet 20 is 100 mm in length, has two grooves 200, and each groove 200 has ten passes (full turns about the magnet axis MA), the axial distance between each groove 200 is 5 mm. Therefore, in this example, the groove amplitude may be between 41% and 49% of 5 mm. As described with respect to the embodiment of FIGS. 1 and 2, the number of grooves 200 and pitch angle PA (and in turn, pitch length PL) may be adjusted based on the desired mechanical strength and magnetic properties of the permanent magnet 20. Additionally, the groove amplitude GA of the grooves 200 may be adjusted based on the desired strength and magnetic properties of the permanent magnet 20.

For example, the groove amplitude GA may be adjusted such that the groove 200 blocks the 'line of sight' of the path of the electrical current through the permanent magnet 20, which interrupts the eddy current flow. Specifically, the line of sight of the path of the electrical current may be accomplished by controlling the amplitude to be 150 to 210 degrees, 160 to 200 degrees, 170 to 190 degrees, or 180 degrees offset from an adjacent groove with respect to and along the axis. The groove amplitude GA of the groove 200 may be approximately ½ or less of an axial distance between two corresponding grooves, as shown in FIG. 4. The number of zig-zags per revolution around the circumference of the permanent magnet 20 may be adjusted based on desired characteristics of the permanent magnet 20. For example, the number of zig-zags per revolution may be ½ the diameter of the permanent magnet 20. The number of grooves 200 may also be calculated using the formula set forth above.

Figure 5:
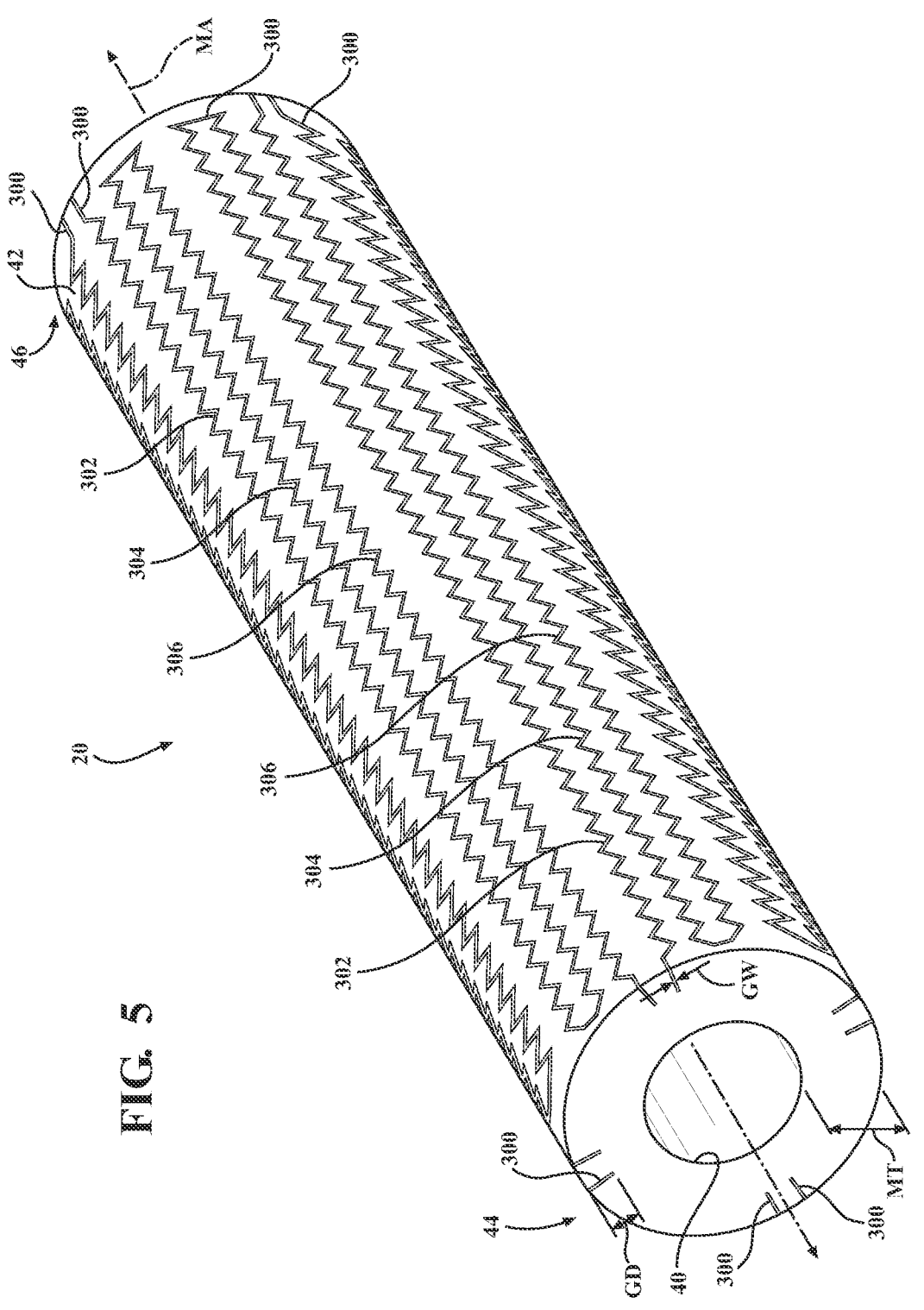
FIG. 5 is a perspective view of another embodiment of the permanent magnet, with the groove having a first groove section extending axially along the magnet axis, and a second groove section extending along the magnet axis parallel to the first groove section, wherein the first and second groove sections have a zig-zag configuration
Figure 6:
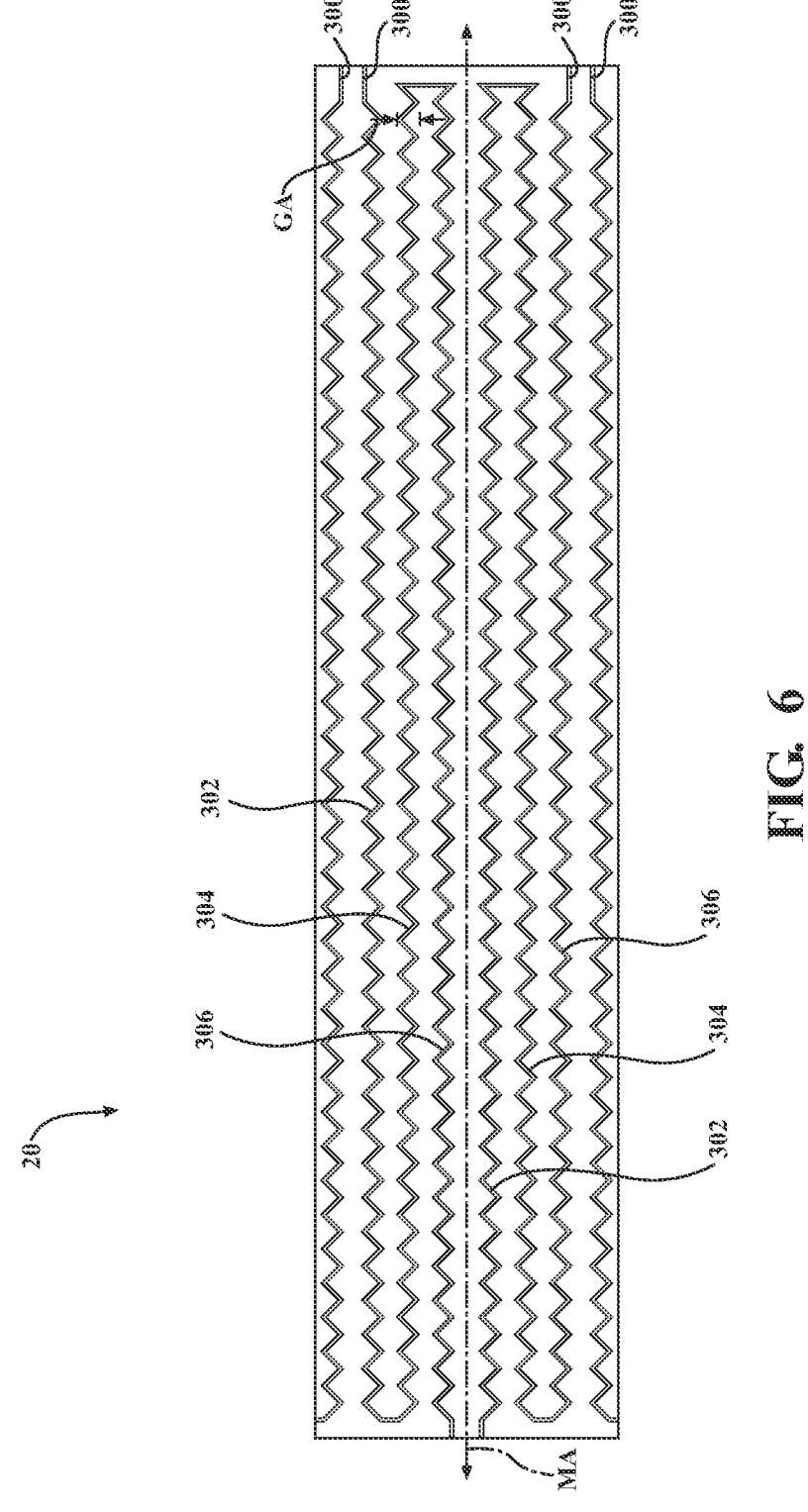
FIG. 6 is a side view of the permanent magnet of FIG. 5.

As shown in FIGS. 5 and 6, the groove 300 is another embodiment in which the groove 300 a zig-zag configuration such that the groove 300 has a non-straight configuration. In such embodiments, as exemplified by FIGS. 5 and 6, the groove 300 may have a first groove section 302 extending axially along the magnet axis MA, and a second groove section 304 extending along the magnet axis MA parallel to the first groove section 302. The first and second groove sections 302, 304 may have a zig-zag configuration. In other words, as the first and second groove sections 302, 304 extend between a first and second magnet end 44, 46 of the permanent magnet 20, the first and second groove sections 302, 304 zig-zag along the magnet axis MA. The first magnet end 44 is spaced axially from the second magnet end 46 along the magnet axis MA. Typically, the first and second groove sections 302, 304 are continuous with one another. With continued reference to FIGS. 5 and 6, the groove 300 may have a third groove section 306 extending along the magnet axis MA parallel to the first and second groove sections 302, 304, with the third groove section 306 having a zig-zag configuration.

With continued reference to FIGS. 5 and 6, it is to be appreciated that the permanent magnet 20 may define more than one groove 300. For example, as shown in FIGS. 5 and 6, the permanent magnet 20 may define eight grooves 300. However, it is to be appreciated that the number of grooves 300 may be adjusted based on the desired mechanical strength and magnetic properties of the permanent magnet 20. Additionally, the groove amplitude GA of the grooves 300 may also be adjusted based on the desired mechanical strength and magnetic properties of the permanent magnet 20.

Figure 7:
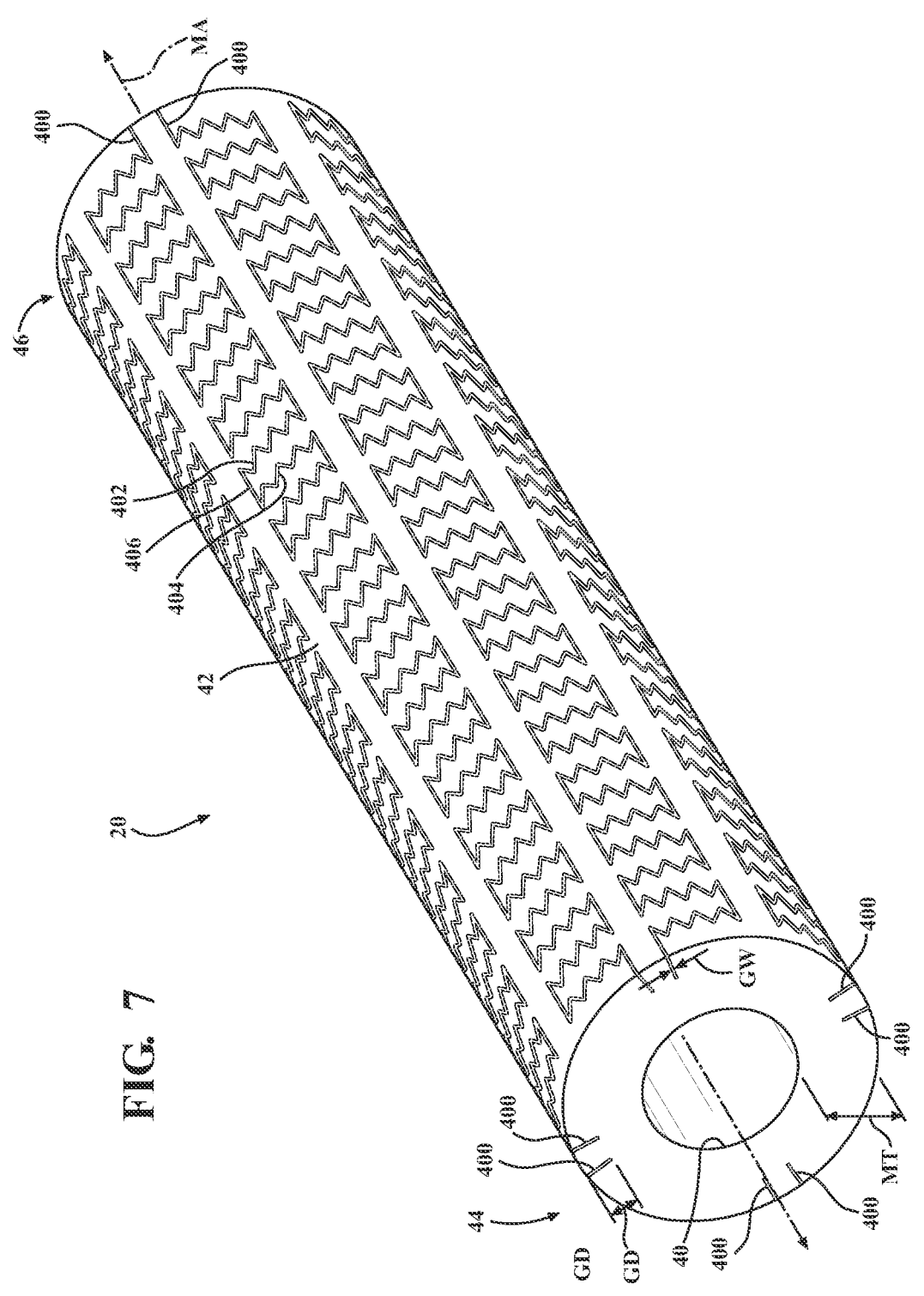
FIG. 7 a perspective view of another embodiment of the permanent magnet, with the groove having a first groove section extending circumferentially about the magnet axis, and a second groove section extending circumferentially about the magnet axis parallel to the first groove section, and wherein the first and second groove sections have a zig-zag configuration
Figure 8:
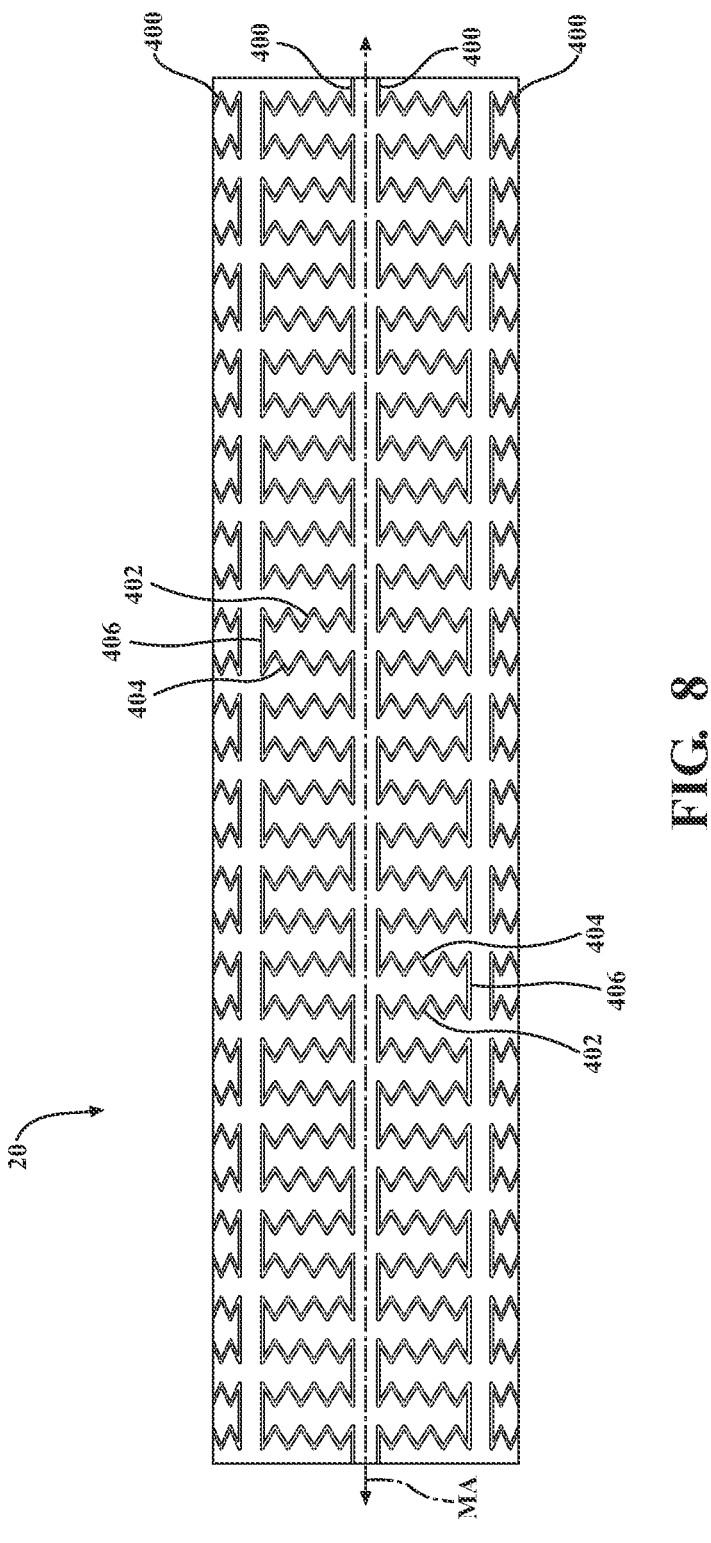
FIG. 8 is a side view of the permanent magnet of FIG. 7.

As shown in FIGS. 7 and 8, the groove 400 is another embodiment in which the groove 400 has a non-straight configuration with respect to the magnet axis MA. In the embodiment of FIGS. 7 and 8, the groove 400 and has a first groove section 402 extending circumferentially about the magnet axis MA, and a second groove section 404 extending circumferentially about the magnet axis MA parallel to the first groove section 402. Typically, when the first and second groove sections 402, 404 extend circumferentially about the magnet axis MA parallel to one another, the first and second groove sections 402, 404 have a U-configuration, with a third groove section 406 connecting the first and second groove sections 402, 404 and extending in the axial direction along the magnet axis MA. The first and second groove sections 402, 404 may have a zig-zag configuration. It is to be appreciated that the permanent magnet 20 may define more than one groove 400. For example, as shown in FIGS. 7 and 8, the permanent magnet 20 may define eight grooves 400. However, it is to be appreciated that the number of grooves 400 may be adjusted based on the desired mechanical strength and magnetic properties of the permanent magnet 20.

Figure 9:
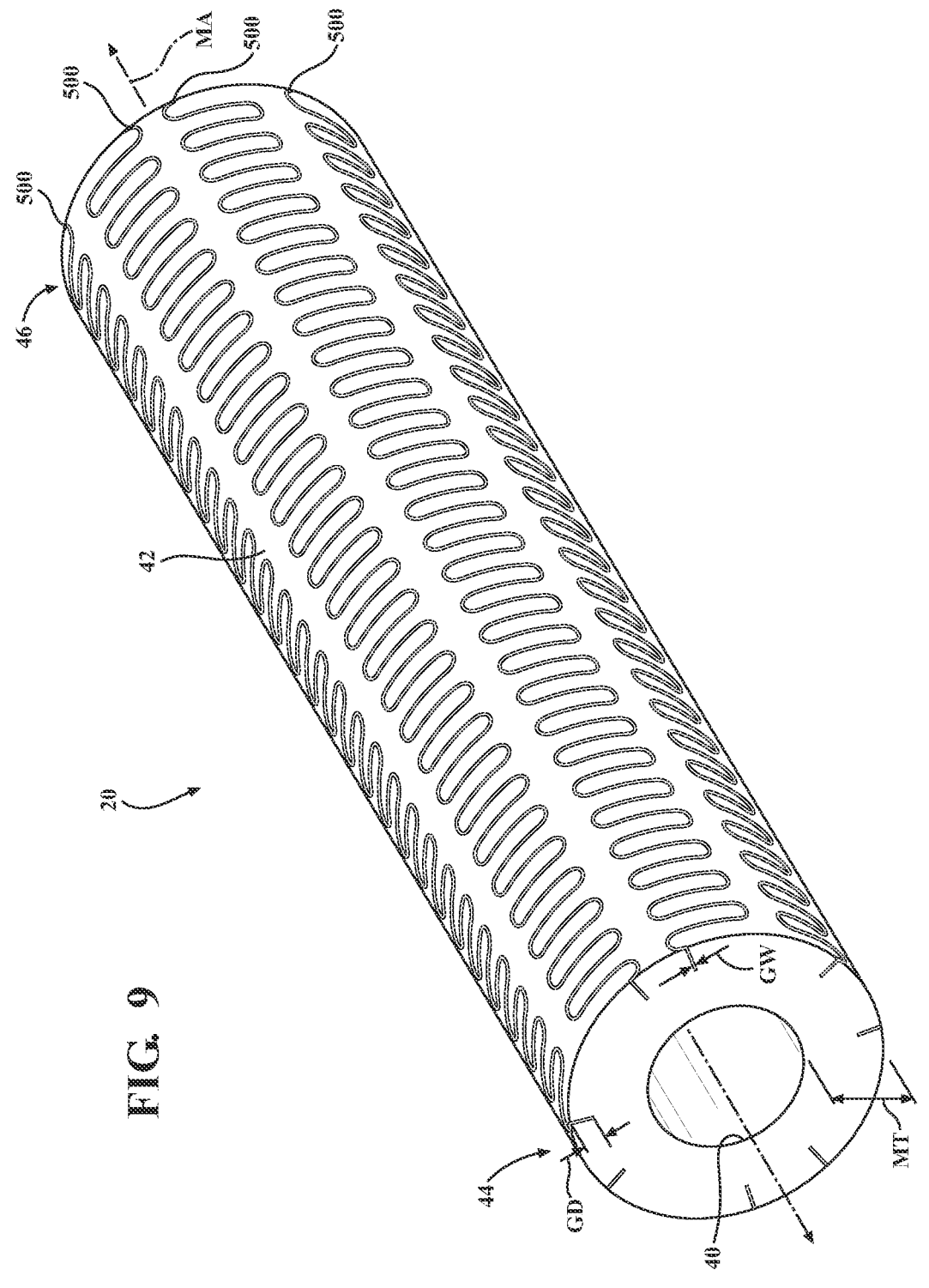
FIG. 9 is a perspective view of another embodiment of the permanent magnet, with the groove having a serpentine configuration.
Figure 10:
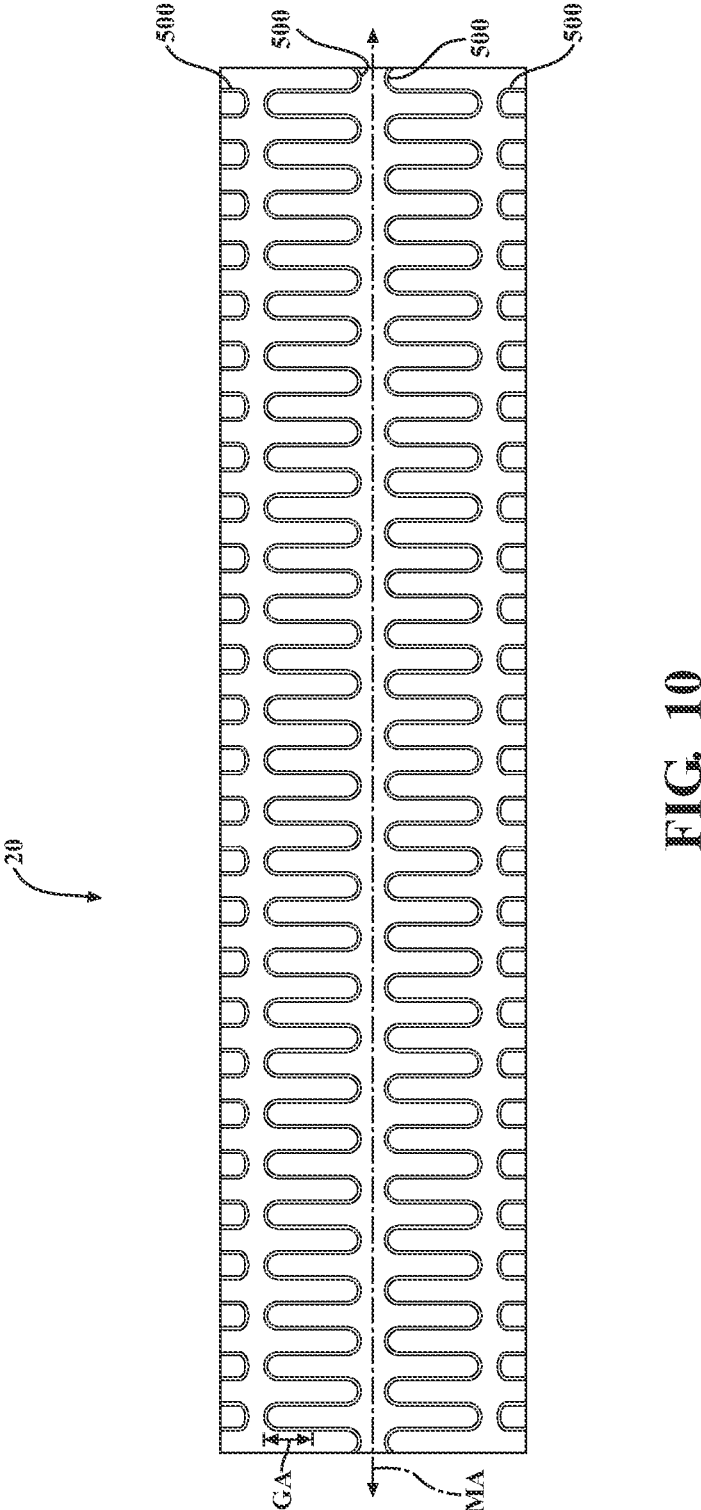
FIG. 10 is a side view of the permanent magnet of FIG. 9.

As shown in FIGS. 9 and 10, the groove 500 is another embodiment in which the groove 500 has a non-straight configuration with respect to the magnet axis MA. Specifically, the groove 500 has a serpentine configuration such that the groove 500 has a non-straight configuration with respect to the magnet axis MA. As with the other embodiments, the groove 500 amplitude GA and number of grooves 500 may be changed based on the desired mechanical strength of the permanent magnet 20 and the magnetic properties of the permanent magnet 20. Additionally, the number of cycles of the groove 500 having the serpentine configuration may also be adjusted based on the desired mechanical strength and magnetic properties of the permanent magnet.

An insulation material may be disposed in the groove 100, 200, 300, 400, 500. Some examples of insulation material include a glue, polymer plastic, acrylic plastic, and the like. Other examples of insulation material include impregnating or trickle resins.

A method of manufacturing the permanent magnet 20 includes the step of removing a portion of the permanent magnet 20 to define the groove 100, 200, 300, 400, 500 that is defined in the permanent magnet 20 and extends axially along the magnet axis MA, with the groove 100, 200, 300, 400, 500 having a non-straight configuration. The step of removing a portion of the permanent magnet 20 to define the groove 100, 200, 300, 400, 500 may be further defined as removing a portion of the permanent magnet 20 from the outer magnet surface 42. It is to be appreciated that the removing a portion of the permanent magnet 20 may be further defined as disrupting the outer magnet surface 42 of the permanent magnet 20 to define the groove 100, 200, 300, 400, 500.

The method may also include the step of cutting a blank of magnetic material to form a permanent magnet having a cylindrical configuration. Typically, the step of cutting the blank of magnetic material to form the permanent magnet 20 having a cylindrical configuration occurs before the step of removing a portion of the permanent magnet 20. The method may also include the step of pressing the permanent magnet 20 to form a hollow cylinder. Typically, the step of pressing the permanent magnet 20 to form a hollow cylinder occurs after the step cutting the blank of magnetic material to form the permanent magnet 20 having the cylindrical configuration. The method may also include pressing the blank in a magnetic field from pulverulent material, for example the materials described above with respect to the permanent magnet 20, to form a permanent magnet from the blank. The method may further include the step of pressing and sintering the permanent magnet 20, which typically occurs after the step of pressing the blank in the magnetic field.

In one embodiment, the step of removing a portion of the permanent magnet 20 to define the groove 100, 200, 300, 400, 500 is further defined as laser etching the permanent magnet 20 to define the groove 100, 200, 300, 400, 500. In another embodiment, the step of removing a portion of the permanent magnet 20 to define the groove 100, 200, 300, 400, 500 is further defined as chemical etching the permanent magnet 20 to define the groove 100, 200, 300, 400, 500. In another embodiment, the step of removing a portion of the permanent magnet 20 to define the groove 100, 200, 300, 400, 500 may be further defined as milling the permanent magnet 20 to define the groove 100, 200, 300, 400, 500. In another embodiment, the step of removing a portion of the permanent magnet 20 to define the groove 100, 200, 300, 400, 500 is further defined as water jetting the permanent magnet 20 to define the groove 100, 200, 300, 400, 500.

What is claimed is:

1. A permanent magnet for use in an electric machine, wherein the permanent magnet has a magnet thickness and extends along a magnet axis, wherein the permanent magnet defines a groove extending axially along the magnet axis that has a groove depth that is less than the magnet thickness, and wherein the groove has a serpentine configuration with respect to the magnet axis.

2. The permanent magnet as set forth in claim 1 having a cylindrical configuration extending along and surrounding the magnet axis, with the cylindrical configuration defining a magnet interior.

3. The permanent magnet as set forth in claim 2 having an outer magnet surface facing away from the magnet axis, wherein the groove is defined by the outer magnet surface.

4. The permanent magnet as set forth in claim 1, wherein an insulation material is disposed in the groove.

5. An electric machine comprising the permanent magnet as set forth in claim 1, wherein the electric machine further comprises a stator disposed about the permanent magnet.

6. The electric machine as set forth in claim 5 further comprising a shaft, a compressor wheel coupled to the shaft, and compressor housing defining a compressor housing interior with the compressor wheel disposed in the compressor housing interior.

7. The electric machine as set forth in claim 6 further comprising a turbine wheel coupled to the shaft and spaced axially from the compressor wheel, and a turbine housing defining a turbine housing interior with the turbine wheel disposed in the turbine housing interior.

8. The permanent magnet as set forth in claim 1 comprising a first magnet end and a second magnet end spaced from the first magnet end along the magnet axis, wherein the groove has the serpentine configuration along the entirety of the permanent magnet between the first magnet end and the second magnet end.

9. An electric machine comprising the permanent magnet as set forth in claim 1, wherein the electric machine further comprises a stator disposed about the permanent magnet.

10. The electric machine as set forth in claim 9 further comprising a shaft, a compressor wheel coupled to the shaft, and compressor housing defining a compressor housing interior with the compressor wheel disposed in the compressor housing interior.

11. The electric machine as set forth in claim 10 further comprising a turbine wheel coupled to the shaft and spaced axially from the compressor wheel, and a turbine housing defining a turbine housing interior with the turbine wheel disposed in the turbine housing interior.

12. A permanent magnet for use in an electric machine, wherein the permanent magnet has a magnet thickness and extends along a magnet axis, wherein the permanent magnet defines a groove extending axially along the magnet axis that has a groove depth that is less than the magnet thickness, wherein the groove has a zig-zag configuration with respect to the magnet axis.

13. The permanent magnet as set forth in claim 12 comprising a first magnet end and a second magnet end spaced from the first magnet end along the magnet axis, wherein the groove has the zig-zag configuration along the entirety of the permanent magnet between the first magnet end and the second magnet end.

14. The permanent magnet as set forth in claim 12, wherein the groove spirals about and along the magnet axis.

15. The permanent magnet as set forth in claim 14, wherein the groove has a pitch angle of between 50 and 60 degrees.

16. The permanent magnet as set forth in claim 12, wherein an insulation material is disposed in the groove.

17. A permanent magnet for use in an electric machine, wherein the permanent magnet has a magnet thickness and extends along a magnet axis, wherein the permanent magnet defines a groove extending axially along the magnet axis that has a groove depth that is less than the magnet thickness, wherein the groove has a non-straight configuration with respect to the magnet axis, and wherein the groove has a first groove section extending axially along the magnet axis, and a second groove section extending along the magnet axis parallel to the first groove section, wherein the first and second groove sections have a zig-zag configuration.

18. The permanent magnet as set forth in claim 17, wherein the first and second groove sections are continuous with one another.

19. The permanent magnet as set forth in claim 17, wherein the groove has a third groove section extending along the magnet axis parallel to the first and second groove sections, and wherein the third groove section has a zig-zag configuration.

20. A permanent magnet for use in an electric machine, wherein the permanent magnet has a magnet thickness and extends along a magnet axis, wherein the permanent magnet defines a groove extending axially along the magnet axis that has a groove depth that is less than the magnet thickness, wherein the groove has a non-straight configuration with respect to the magnet axis, and wherein the groove has a first groove section extending circumferentially about the magnet axis, and a second groove section extending circumferentially about the magnet axis parallel to the first groove section, and wherein the first and second groove sections have a zig-zag configuration.

* * * * *